US010042791B2

(12) United States Patent
Hirade et al.

(10) Patent No.: US 10,042,791 B2
(45) Date of Patent: Aug. 7, 2018

(54) ABNORMAL INTERRUPT REQUEST PROCESSING

(71) Applicant: RENESAS ELECTRONICS CORPORATION, Tokyo (JP)

(72) Inventors: Takuya Hirade, Tokyo (JP); Yukitoshi Tsuboi, Tokyo (JP); Ryosuke Okuda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/588,246

(22) Filed: May 5, 2017

(65) Prior Publication Data

US 2017/0242809 A1   Aug. 24, 2017

Related U.S. Application Data

(63) Continuation of application No. 14/328,154, filed on Jul. 10, 2014, now Pat. No. 9,678,900.

(30) Foreign Application Priority Data

Jul. 11, 2013  (JP) .................................. 2013-145230

(51) Int. Cl.
  *G06F 13/24* (2006.01)
  *G06F 11/22* (2006.01)
(52) U.S. Cl.
  CPC .......... *G06F 13/24* (2013.01); *G06F 11/2231* (2013.01); *G06F 11/2273* (2013.01); *Y02D 10/14* (2018.01)
(58) Field of Classification Search
  CPC ... G06F 13/24; G06F 11/2231; G06F 11/2273
  See application file for complete search history.

(56) References Cited

U.S. PATENT DOCUMENTS 5,193,195 A   3/1993  Miyazaki
5,790,871 A   8/1998  Qureshi et al.
(Continued)

FOREIGN PATENT DOCUMENTS

JP    03-109644 U    5/1991
JP    H07-271408 A   10/1995
(Continued)

OTHER PUBLICATIONS

European Search Report issued in counterpart European Patent Application No. 14172824.6 dated Feb. 10, 2015; 6 pages.
(Continued)

*Primary Examiner* — Glenn A. Auve
(74) *Attorney, Agent, or Firm* — McDermott Will & Emery LLP

(57) ABSTRACT

To detect an abnormality in an interrupt control system without completely depending on dualization of a circuit, without the need to create a test pattern for a built-in self-test by spending time, and without considerably increasing an amount of power consumption. A test interrupt request is generated periodically using a timer or the like in an interrupt signal system from an interrupt controller to a central processing unit, the state of an interrupt request flag within the interrupt controller is checked in an interrupt processing routine, and in the case where it is detected that the same interrupt request flag is kept in a set state twice or more in succession, it is supposed that there is a high possibility that a failure has occurred in the interrupt signal system and it is considered that there is an abnormality.

9 Claims, 11 Drawing Sheets

(56) References Cited

U.S. PATENT DOCUMENTS

| | | | | |
|---|---|---|---|---|
| 5,983,330 A * | 11/1999 | Miwa | ................. | G06F 11/0757 |
| | | | | 710/262 |
| 6,587,966 B1 | 7/2003 | Chaiken et al. | | |
| 9,678,900 B2 * | 6/2017 | Hirade | ................ | G06F 11/2231 |
| 2008/0288828 A1 | 11/2008 | Baker et al. | | |
| 2014/0181344 A1 * | 6/2014 | Shiratori | ............. | G06F 11/0757 |
| | | | | 710/264 |

FOREIGN PATENT DOCUMENTS

| | | |
|---|---|---|
| JP | H09-198280 A | 7/1997 |
| JP | 2000-347880 A | 12/2000 |
| JP | 2010-262432 A | 11/2010 |

OTHER PUBLICATIONS

Notification of Reasons for Refusal issued in corresponding Japanese Patent Application No. 2013-145230, dated Dec. 15, 2016 (with English translation).

U.S. Notice of Allowance dated Feb. 7, 2017 issued in U.S. Appl. No. 14/328,154.

Michio Okamura, "Special Feature Interrupt / Real time / Multitask . . . Interrupt Research in Personal Computer From Introduction to Interrupt to Realizing Method by Basic / Assembler / C." Interface, CQ Publishing Co., Ltd., Jan. 1, 1989, vol. 15. No. 1 (concise explanation can be found in JP Notice of Reasons for Refusal dated Dec. 15, 2016).

U.S. Non-Final Office Action dated Oct. 4, 2016 issued in U.S. Appl. No. 14/328,154.

* cited by examiner

ABNORMAL INTERRUPT REQUEST PROCESSING

CROSS-REFERENCE TO RELATED APPLICATION

This application is a continuation application of U.S. patent application Ser. No. 14/328,154, filed on Jul. 10, 2014, which claims the benefit of Japanese Patent Application No. 2013-145230 filed on Jul. 11, 2013 including the specification, drawings and abstract is incorporated herein by reference in their entireties.

BACKGROUND

The present invention relates to a failure detection technique of an interrupt signal system configured to give an instruction to interrupt a central processing unit on the basis of an interrupt request, and relates to, for example, a technique effective when being applied to failure detection of a safety-related interrupt signal system in a microcomputer used for onboard control equipped with a fail-safe function.

As regulations on hardware and software of a microcomputer used for onboard control equipped with a fail-safe function, for example, there are functional safety standards, such as ISO 26262 and IEC 61508, because the microcomputer is used in an electronic control device strongly related to human life. As means to implement the fail-safe function, the lock-step architecture is applied widely. For example, the core of the central processing unit is dualized and each of the cores is caused to execute the same software in parallel, and a failure of the system is detected quickly by determining whether or not a discrepancy occurs between the operation results. Such a lock-step architecture considerably increases the scale of the hardware. As an example of a literature that describes the lock-step operation in the onboard microcomputer, there is Japanese Patent Laid-Open No. 2010-262432 (Patent Literature 1).

In the onboard microcomputer, a very large number of functional safety-related interrupt requests are generated. In the improvement of the fail-safe function in the onboard microcomputer, it becomes necessary to enable detection of a failure in the interrupt controller and interrupt signal system configured to perform interrupt control on the central processing unit by performing processing in accordance with the priority level and interrupt mask on such interrupt requests. As the techniques to detect a failure and malfunction of the interrupt control function, there are descriptions in, for example, Japanese Patent Laid-Open No. 1997-198280 (Patent Literature 2), Japanese Patent Laid-Open No. 2000-347880 (Patent Literature 3), and Japanese Patent Laid-Open No. 1991-109644 (Patent Literature 4).

Patent Literature 2 describes the technique to enable detection of a failure and malfunction related to generation of a real-time processing request coupled to the interrupt request input terminal of the interrupt controller by using the watchdog timer monitoring function.

Patent Literature 3 discloses the technique to solve trouble in the case where, after the interrupt controller having received an interrupt request signal outputs an interrupt signal to the CPU, the interrupt request signal is invalidated during the time until the CPU returns a response signal corresponding thereto. In other words, the technique cancels the state where the CPU cannot read the vector address for a long time, by the fact that the interrupt controller monitors such a state and notifies the CPU of that.

Patent Literature 4 describes that in the case where the interrupt controller is tested using a tester, it is not easy to create a test pattern due to the relationship with the operation of the CPU and the test takes time, and thus the internal data and vector of the interrupt controller are output directly to the outside of the LSI or it is made possible to supply necessary data to the interrupt controller through the internal bus.

SUMMARY

The present inventors have investigated easy detection of a failure in the interrupt controller and interrupt signal system in order to enhance the fail-safe function in the microcomputer, particularly, in order to enhance reliability of the functional safety-related interrupt processing that deals with a large number of kinds of interrupts. It is possible to adopt the lock-step architecture also for the interrupt controller, but in the case where the number of pieces of functional safety-related interrupt processing is very large as in the microcomputer used for onboard control, the circuit scale becomes too large due to dualization, and thus the size of the chip is increased and the cost is raised. Furthermore, if the device structure in which the built-in self-test (BIST) of the logic and memory can be conducted as the test of the hardware at the time of activation is adopted, it is possible to detect a failure in the interrupt signal system by the built-in self-test, but it is not easy to create a test pattern for increasing the coverage when executing the test, and new measures are necessary in order to prevent power consumption from becoming too large when the scale of the test becomes large. Even in the case of Patent Literature 4, it is not possible to ignore the increase in the circuit scale due to additional hardware. Particularly in the case where the scale of the interrupt control function is large, as in the case where the number of functional safety-related interrupt requests is very large as in the microcomputer used for onboard control, it becomes all the more difficult to ignore the increase in the circuit scale. By Patent Literatures 2 and 3, it is not possible to expect enabling easy detection of a failure and malfunction of the interrupt controller itself.

The other tasks and the new feature will become clear from the description of the present specification and the accompanying drawings.

The following explains briefly the outline of a typical embodiment among the embodiments disclosed in the present application.

A test interrupt request is generated periodically using a timer or the like in the interrupt signal system from the interrupt controller to the central processing unit and the state of the interrupt request flag within the interrupt controller is checked in the interrupt processing routine and in the case where it is detected that the same functional safety-related interrupt request flag is kept in a set state twice or more in succession, it is considered that the test has failed, i.e., there is an abnormality on the assumption that there is a high possibility of the occurrence of a failure in the interrupt signal system.

The following explains briefly the effect acquired by the typical embodiment among the embodiments disclosed in the present application.

It is possible to detect an abnormality in the interrupt control system without completely depending on dualization of the circuit, without the need to create a test pattern for the built-in self-test by spending time, and without considerably increasing the amount of power consumption.

DETAILED DESCRIPTION

1. Outline of Embodiments

Figure 1:
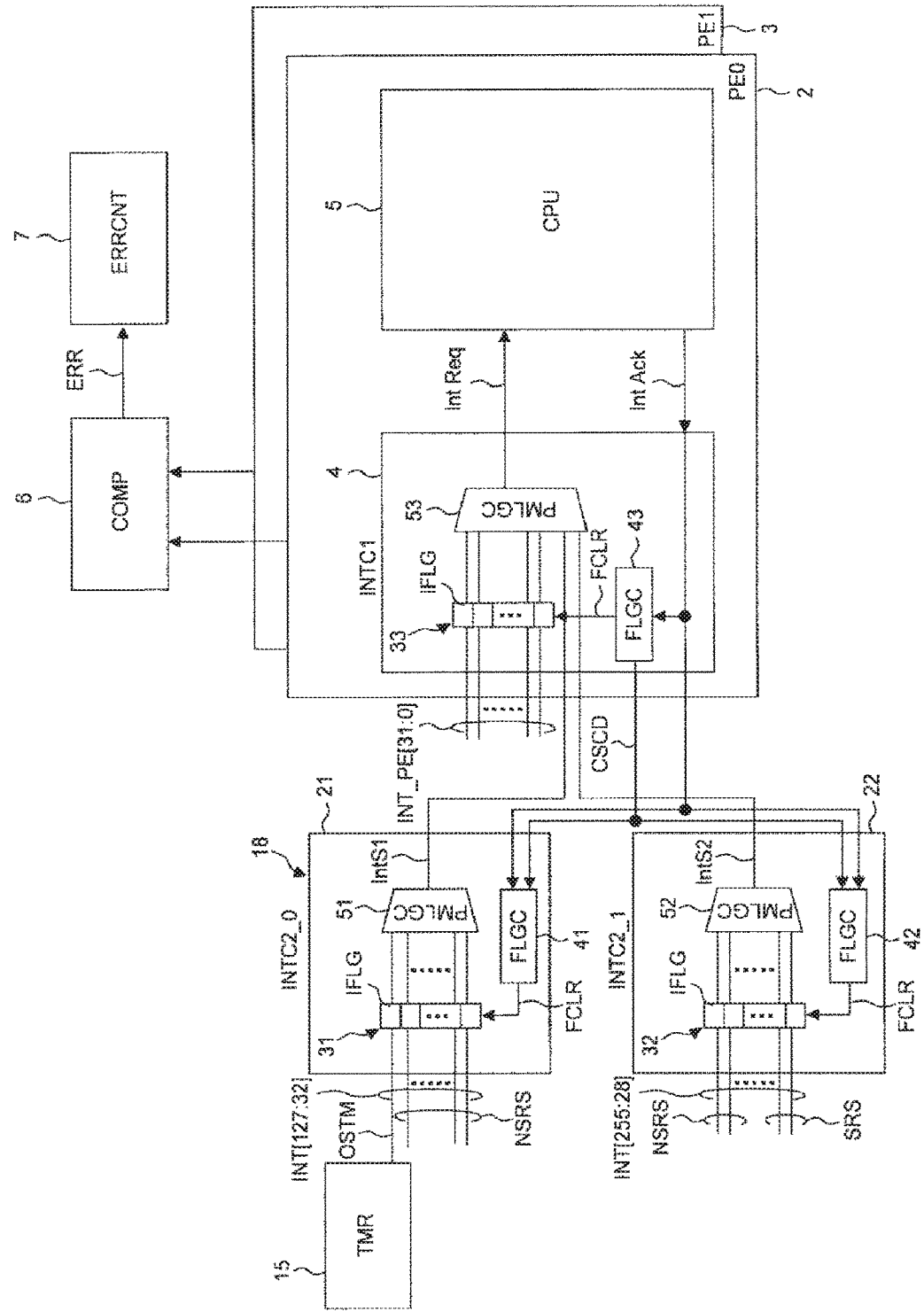
FIG. 1 is a block diagram illustrating details of a first embodiment of failure detection in an interrupt control system of a microcomputer.

First, a representative embodiment disclosed in the present application will be outlined below. Reference numerals in the drawings which are referred to in parentheses in the outline description of the representative embodiment merely exemplify a component included in the concept of the component indicated by the reference numeral.

[1]<Determination of Whether or not Interrupt Request Flag Referred to Periodically is in a Set State a Plurality of Times in Succession>

A microcomputer (1) has a central processing unit (5) and an interrupt controller (4, 18, 21, 22, 21A). The central processing unit considers that there is an abnormality by referring to an interrupt request flag (IFLG) held by the interrupt controller in response to a predetermined test interrupt request (OSTM) generated periodically at predetermined intervals and by determining that the same interrupt request flag is in a set state a plurality of times in succession by the reference made by a plurality of the test interrupt requests.

According to the above, in the case where it is detected that the same interrupt request flag is kept in a set state twice or more in succession as the result of the reference to the interrupt request flag within the interrupt controller for each test interrupt request generated periodically, the interrupt by the interrupt request flag in a set state is not processed yet and still remains and it can be considered that the longer this state lasts, the higher is the probability that a failure has occurred in the interrupt signal system. By considering this state as a state where there is an abnormality, it is possible to enhance the functional safety of the system controlled by the microcomputer. In particular, the lock-step architecture implemented by entirely dualizing the interrupt controller is not caused to completely bear the responsibility, and thus a considerable increase in the circuit scale is not necessary. Furthermore, it is not necessary to create a test pattern for the built-in self-test by spending time and the amount of power consumption does not increase considerably due to the built-in self-test. As described above, it is possible to detect an abnormality in the interrupt control system without increasing the circuit scale, without spending time to create a test pattern, and without considerably increasing the amount of power consumption associated with the test.

[2]<Test Interrupt Request and Interrupt Request for which Interrupt Request Flag is to be Referred to are Input to Different Interrupt Controllers>

In section 1, the interrupt controller has a first interrupt controller (21) to which the test interrupt request is given and a second interrupt controller (22) having an interrupt request flag to be referred to by processing of the central processing unit in response to the test interrupt request (see FIG. 1).

According to the above, the case is supposed where interrupt requests are roughly divided into functional safety-related interrupt requests required to have high functional safety and functional non-safety-related interrupt requests not required to have high functional safety. At this time, by making the interrupt controller on the side to which the test interrupt request is input, different from that on the side to which the interrupt request for which the interrupt request flag is referred to is input, it is possible to limit the range in which the interrupt request flag is referred to in the interrupt processing by the test interrupt request, to the second interrupt controller on the side of the functional safety-related interrupt request. In addition, in the case where it is considered that there is an abnormality, it becomes possible to limit the range in which the abnormality is addressed, to the signal system including the second interrupt controller.

[3]<Dualization of Test Interrupt Request Generation Circuit>

Figure 5:
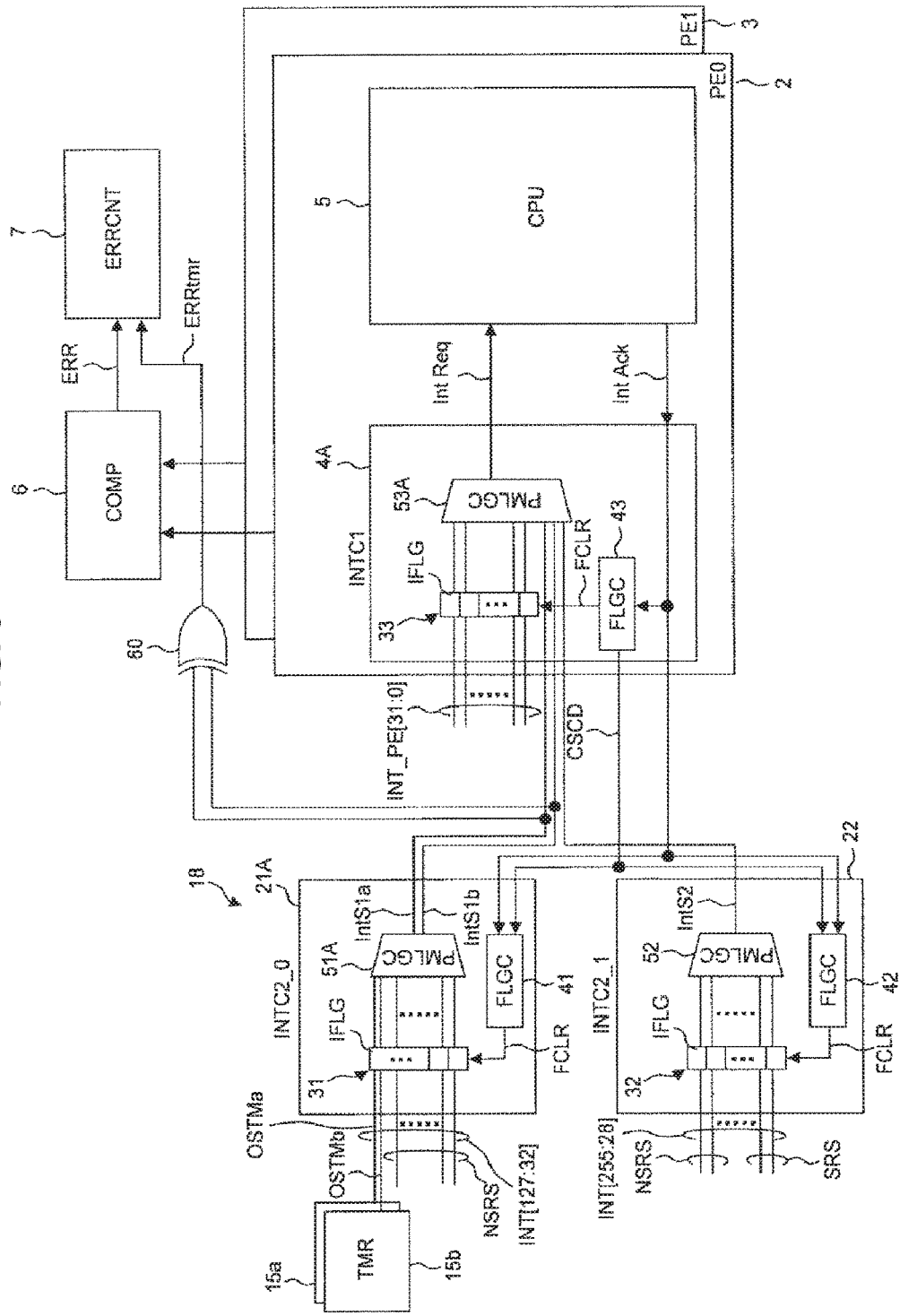
FIG. 5 is a block diagram illustrating a main configuration according to a second embodiment as an interrupt control system of the microcomputer.

In section 2, a test interrupt request generation circuit (15a, 15b) configured to generate the test interrupt request is dualized (see FIG. 5). The first interrupt controller (21A) further has a determination circuit configured to individually perform reception control of each of the test interrupt requests input in parallel from the dualized test interrupt request generation circuit separately from other interrupt requests and to determine whether or not the results of the reception control individually performed coincide with each other.

According to the above, it is possible to detect a discrepancy between the signals from the dualized test interrupt request generation circuit, and thus it is possible to guarantee the validity for the result of the processing by the test interrupt request. Consequently, it is possible to avoid the state where the processing by the central processing unit based on the test interrupt request cannot be performed due to a failure in the test interrupt processing system, and thus safety can be further enhanced from the viewpoint of the functional safety of the system.

[4]<Interrupt Request to Second Interrupt Controller is Selectively Input to First Interrupt Controller>

Figure 7:
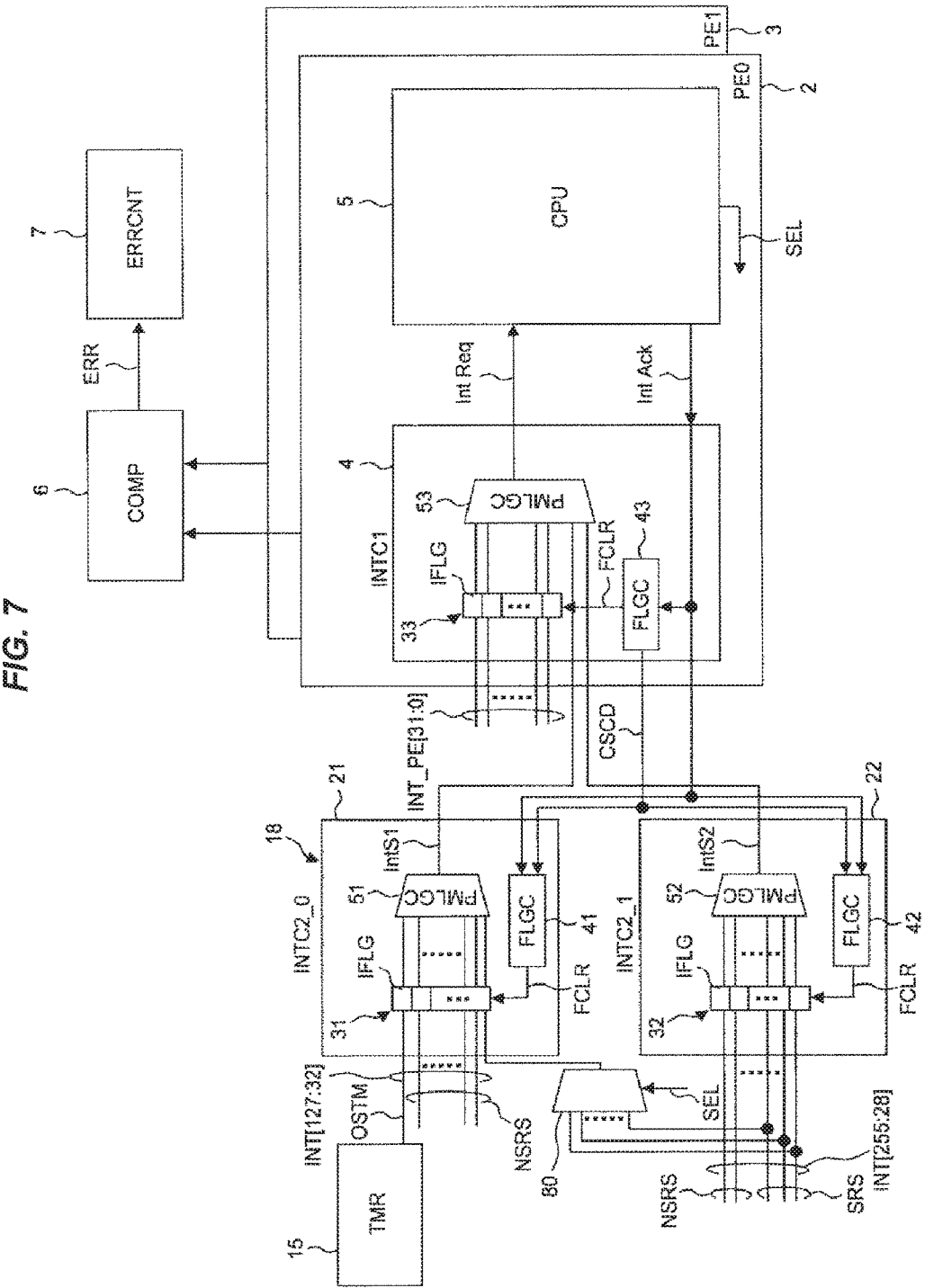
FIG. 7 is a block diagram illustrating a main configuration according to a third embodiment as an interrupt control system of the microcomputer.

In section 2, there is further included a selector (80) configured to select an interrupt request to be input to the second interrupt controller and to input the interrupt request to the first interrupt controller (see FIG. 7). When it is considered that there is an abnormality by referring to the interrupt request flag of the interrupt controller, the central processing unit performs processing to cause the selector to select the interrupt request corresponding to the interrupt request flag for which it is determined that the same interrupt request flag is in a set state a plurality of times in succession by the reference made by a plurality of the test interrupt requests and to input the interrupt request to the first interrupt controller.

According to the above, by giving, to the first interrupt controller, the interrupt request corresponding to the interrupt request flag determined to be in a set state a plurality of times in succession even when it is considered that there is an abnormality, it becomes possible to continue the original processing by the interrupt request. In short, it becomes possible to perform continuous processing as an emergency measure when a problem occurs in the system.

[5]<Cascade Coupling of Interrupt Controllers>

In section 1, the interrupt controller has a master interrupt controller (4) and a slave interrupt controller (18) cascade-coupled. The master interrupt controller is configured to be capable of receiving a plurality of interrupt requests and outputs an interrupt signal to the central processing unit in accordance with the result of the reception control on the input interrupt request. The slave interrupt controller is configured to be capable of receiving a plurality of interrupt requests and outputs an interrupt request signal to the master interrupt controller in accordance with the result of the reception control on the input interrupt request.

According to the above, it is possible to deal with a large number of interrupt request signals that cannot be processed by one interrupt controller, by cascade-coupling the interrupt controllers.

[6]<Each of Cascade-Coupled Slave and Master Holds Interrupt Request Flag for Interrupt Request and Refers Thereto>

Figure 8:
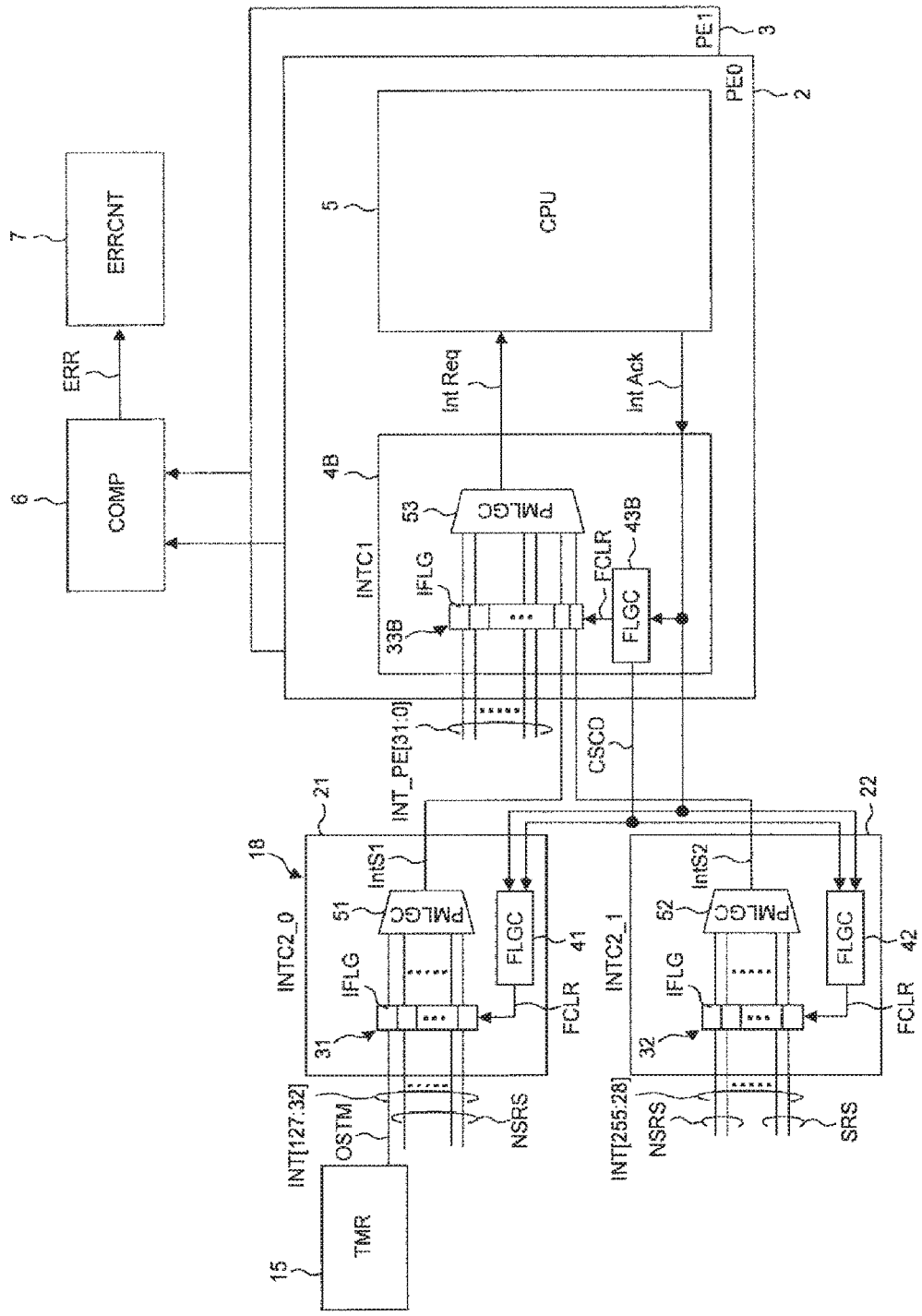
FIG. 8 is a block diagram illustrating a main configuration according to a fourth embodiment as an interrupt control system of the microcomputer.

In section 5, in response to a predetermined test interrupt request generated periodically at predetermined intervals, the central processing unit refers to a slave-side interrupt request flag (IFLG corresponding to SRS) held by the slave interrupt controller (22) and a master-side interrupt request flag (IFLG corresponding to IntS2) held by the master interrupt controller, which is set in correspondence to the interrupt request signal supplied from the slave interrupt controller to the master interrupt controller (4) (see FIG. 8). The central processing unit considers that there is an abnormality by determining that the same slave-side interrupt request flag is in a set state a plurality of times in succession and that the master-side interrupt request flag corresponding thereto is in a set state or not in a set state a plurality of times in succession by the reference made by a plurality of the test interrupt requests.

According to the above, by referring to the state of the interrupt request flag with respect to the interrupt request of each of the cascade-coupled slave side and the master side, it becomes possible to determine, for example, whether or not the failure portion is before the interrupt request flag of the master interrupt controller.

[7]<Failure in Path from Slave Interrupt Controller to Master Interrupt Controller>

In section 6, the central processing unit considers that there is an abnormality in the path to the input of the central processing unit via the slave interrupt controller and the master interrupt controller by determining that the same slave-side interrupt request flag is in a set state a plurality of times in succession and at the same time, that the master-side interrupt request flag corresponding thereto is in a set state a plurality of times in succession by the reference made by a plurality of the test interrupt requests. Furthermore, the central processing unit considers that there is an abnormality in the path from the slave interrupt controller to the input of the master interrupt controller by determining that the same slave-side interrupt request flag is in a set state a plurality of times in succession and at the same time, that the master-side interrupt request flag corresponding thereto is not in a set state a plurality of times in succession by the reference made by a plurality of the test interrupt requests.

Due to the above, it becomes possible to specifically determine whether or not the failure portion is before the interrupt request flag of the master interrupt controller.

[8]<Predetermined Test Interrupt Request is Input to Master Interrupt Controller>

Figure 10:
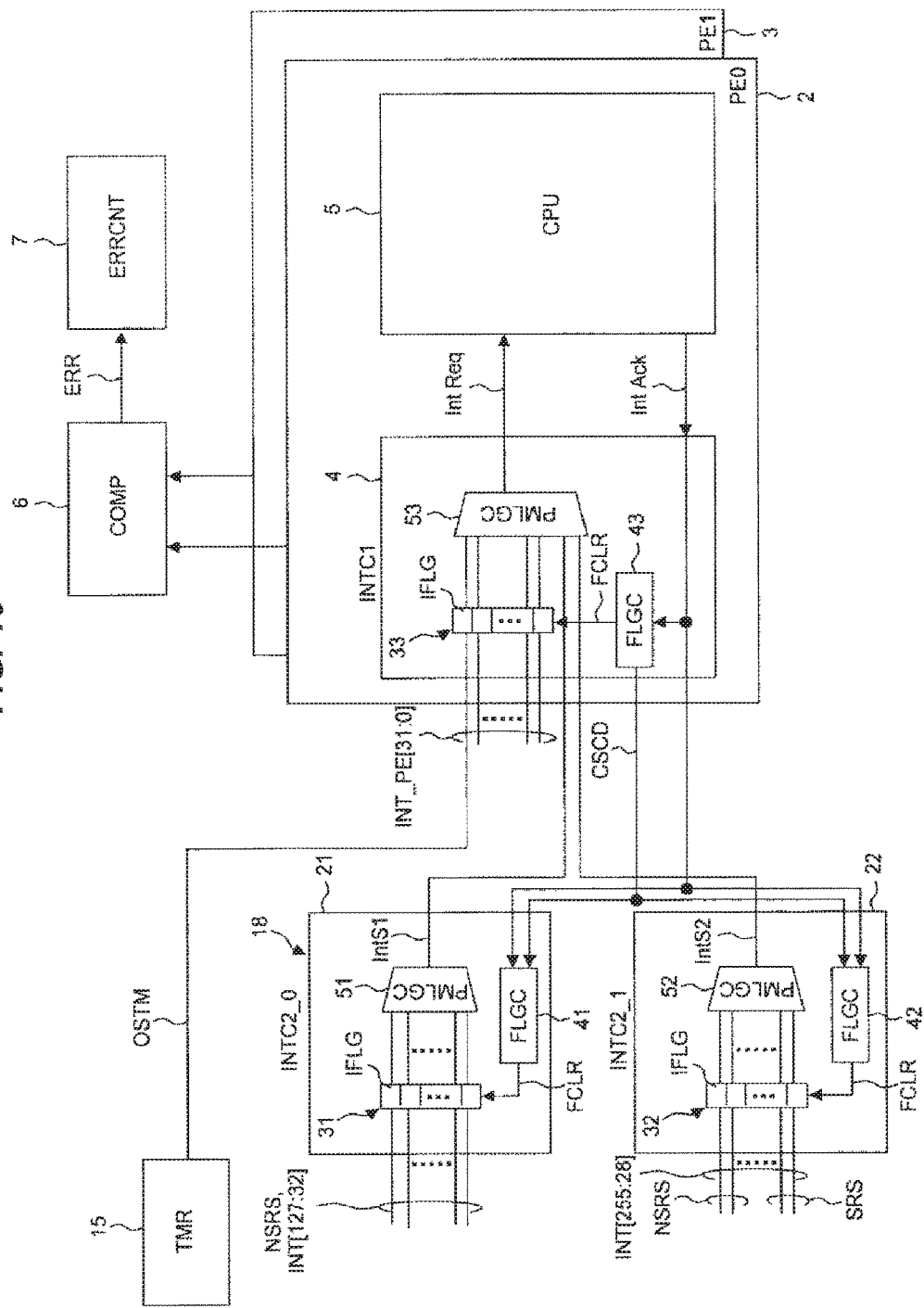
FIG. 10 is a block diagram illustrating a main configuration according to a sixth embodiment as an interrupt control system of the microcomputer, together with one slave interrupt controller.
Figure 11:
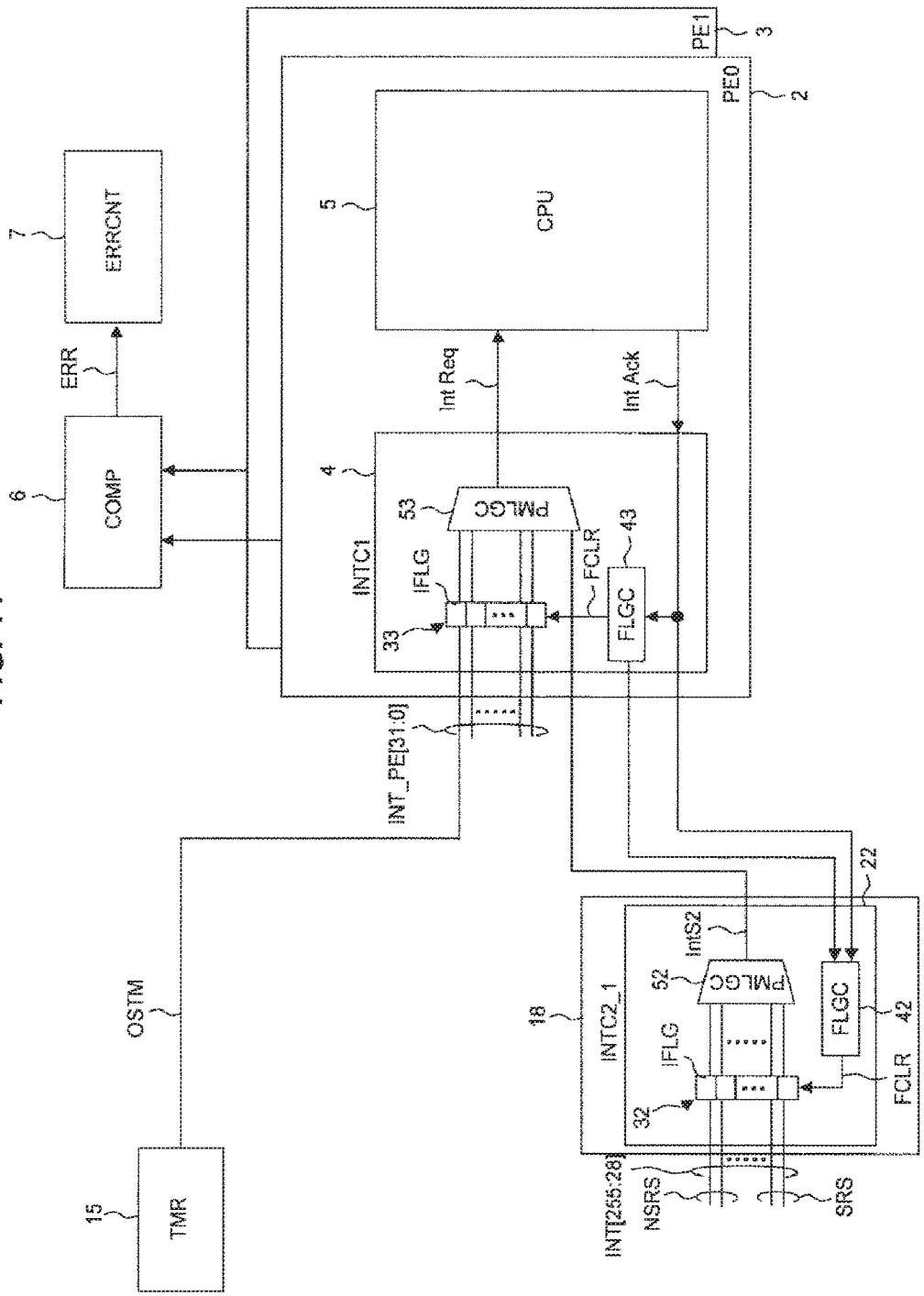
FIG. 11 is a block diagram illustrating a main configuration according to the sixth embodiment as an interrupt control system of the microcomputer, together with two slave interrupt controllers.

In section 5, the predetermined test interrupt request is input to the master interrupt controller (see FIG. 10 and FIG. 11).

According to the above, since the interrupt controller that receives a test interrupt request signal is provided only in one stage, it is possible to reduce the possibility that an abnormality occurs in the processing by the test interrupt request signal in comparison with the case where the test interrupt request signal is input to the cascade-coupled slave side.

[9]<Test Interrupt Request and Interrupt Request for which Interrupt Request Flag is Referred to are Input to Different Slave Interrupt Controllers>

In section 5, the slave interrupt controller has a first slave interrupt controller (21) to which the test interrupt request is given and a second slave interrupt controller (22) having an interrupt request flag to be referred to by processing of the central processing unit in response to the test interrupt request (see FIG. 1).

According to the above, also in the case of the cascade coupling configuration, the case is supposed where interrupt requests are roughly divided into functional safety-related interrupt requests required to have high functional safety and functional non-safety-related interrupt requests not required to have high functional safety. At this time, by making the slave interrupt controller on the side to which the test interrupt request is input, different from that on the side to which the interrupt request for which the interrupt request flag is referred to is input, it is possible to limit the range in which the interrupt request flag is referred to in the interrupt processing by the test interrupt request to the second slave interrupt controller on the side of the functional safety-related interrupt request. In addition, in the case where it is considered that there is an abnormality, it is possible to limit the range in which the abnormality is addressed, to the signal system including the second salve interrupt controller.

[10]<Test Interrupt Request Generation Circuit is Dualized>

In section 9, a test interrupt request generation circuit (15a, 15b) configured to generate the test interrupt request is dualized (see FIG. 5). The first slave interrupt controller further includes a determination circuit configured to individually perform reception control of each of the test interrupt requests input in parallel from the dualized test interrupt request generation circuit separately from other interrupt requests and to determine whether or not the results of the reception control individually performed coincide with each other. The master interrupt controller processes an AND signal of the results of the reception control individually performed by the first slave interrupt controller as one interrupt request.

According to the above, it is possible to detect a discrepancy between the signals from the dualized test interrupt request generation circuit, and thus it is possible to guarantee the validity for the result of the processing by the test interrupt request. Consequently, it is possible to avoid the state where the processing by the central processing unit based on the test interrupt request cannot be executed due to a failure in the test interrupt processing system, and thus safety can be further enhanced from the viewpoint of the functional safety of the system.

[11]<Interrupt Request to Second Slave Interrupt Controller is Selectively Input to First Slave Interrupt Controller>

In Section 9, there is further included a selector (80) configured to select an interrupt request to be input to the second slave interrupt controller and to input the interrupt request to the first slave interrupt controller (see FIG. 7). When it is considered that there is an abnormality by referring to the interrupt request flag of the second salve interrupt controller, the central processing unit performs processing to cause the selector to select the interrupt request corresponding to the interrupt request flag for which it is determined that the same interrupt request flag is in a set state a plurality of times in succession by the reference made by a plurality of the test interrupt requests and to input the interrupt request to the first slave interrupt controller.

According to the above, by giving, to the first slave interrupt controller, the interrupt request corresponding to the interrupt request flag determined to be in a set state a plurality of times in succession even when it is considered that there is an abnormality, it becomes possible to continue the original processing by the interrupt request. In short, it becomes possible to perform continuous processing as an emergency measure when a problem occurs in the system.

[12]<Lock-Step by Dualization of Master Interrupt Controller and Central Processing Unit>

In section 5, the master interrupt controller (4) and the central processing unit (5) are dualized (2, 3), respectively, and operated in parallel to each other, to thereby have the lock-step architecture that enables detection of an abnormality based on the difference in the operation result therebetween.

According to the above, by adopting the lock-step architecture in a part that is accepted in terms of area, it is possible to contribute to further enhancement of the functional safety.

[13]<Dualization of Test Interrupt Request Generation Makes it Possible to Input Test Interrupt Request and Interrupt Request for which Interrupt Request Flag is Referred to to the Same Interrupt Controller>

In section 1, the interrupt controller has a first interrupt controller (21A) to which the test interrupt request and a first interrupt request are given and a second interrupt controller (22) to which a second interrupt request is given. A test interrupt request generation circuit (15a, 15b) configured to generate the test interrupt request is dualized. The first interrupt controller further has a determination circuit (60) configured to individually perform reception control of each of the test interrupt requests input in parallel from the dualized test interrupt request generation circuit separately from the first interrupt request and to determine whether or not the results of the reception control individually performed coincide with each other. The central processing unit considers that there is an abnormality by referring to the interrupt request flags held by the first interrupt controller and the second interrupt controller in response to the predetermined test interrupt request generated periodically at predetermined intervals and by determining that the same interrupt request flag is in a set state a plurality of times in succession by the reference made by a plurality of the test interrupt requests (see FIG. 9).

According to the above, it is possible to detect reliably the generation of a test interrupt request and the occurrence of an abnormality in the reception control thereof and to easily guarantee that a test interrupt request is generated normally and enabled to be received by the central processing unit. In other words, it becomes possible to detect an abnormality in the processing to receive an interrupt request by the first interrupt controller and an abnormality in the signal path, and thus it is possible to contribute to further enhancement of the functional safety by supplying the functional safety-related interrupt request signal to the first interrupt controller without being limited to the second interrupt controller. Also in such a case, making determination by referring to the interrupt request flag on the side of the first interrupt controller in response to the test interrupt request contributes to further enhancement of the functional safety.

[14]<Timer Interrupt Request>

In section 1, there is further included a timer and the predetermined test interrupt request is a timer interrupt request generated from the timer (15) at predetermined intervals.

According to the above, it is possible to determine arbitrarily intervals at which the test interrupt request is generated periodically, on the basis of the control of the central processing unit.

[15]<Interrupt Request Flag Corresponding to Safety-Related Interrupt Request>

In section 14, the interrupt request flag to be referred to is an interrupt request flag corresponding to the safety-related interrupt request for which the functional safety is taken into consideration.

According to the above, this is suitable for the microcomputer used for onboard control equipped with the fail-safe function that uses a number of safety-related interrupt requests.

[16]<Predetermined Interval>

In section 15, the predetermined interval is a time shorter than FTTI (Fault Tolerant Time Interval) that is taken into consideration in the fail-safe processing by the safety-related interrupt request.

In the normal state, the processing by the safety-related interrupt request is completed before the FTTI time elapses and the interrupt request flag thereof is cleared from the set state. In contrast to this, if there is an abnormality, the processing by the safety-related interrupt request is not completed even after the FTTI time elapses and the interrupt request flag is kept in a set state. Consequently, by setting the interval at which the test interrupt request is generated to be shorter than the FTTI time, it becomes possible to consider that there is an abnormality by determining that the same interrupt request flag is in a set state twice in succession in the processing of the first time test interrupt request and in the processing of the second time test interrupt request.

[17]<Test Interrupt Request in User Mode>

In section 15, the predetermined test interrupt request is generated periodically from the timer in accordance with the control of the central processing unit in the user mode.

According to the above, the transition from the user mode to a special test mode is not necessary and it is possible to perform the processing by the test interrupt, as one piece of interrupt processing in the user mode, and thus it is possible to detect a deterioration due to the secular change in the system or in the actual device.

[18]<Failure Supposed by Processing Determined in Advance>

In section 1, the abnormality considered to exist by the central processing unit is an abnormality supposed in the path from the interrupt controller to the central processing unit.

Due to the above, it is possible to predetermine exceptional processing, recovery processing, or the like, for the determination that there is an abnormality in accordance with the supposed abnormality.

2. Details of Embodiment

The embodiment will be described in more detail.

<<Microcomputer>>

Figure 2:
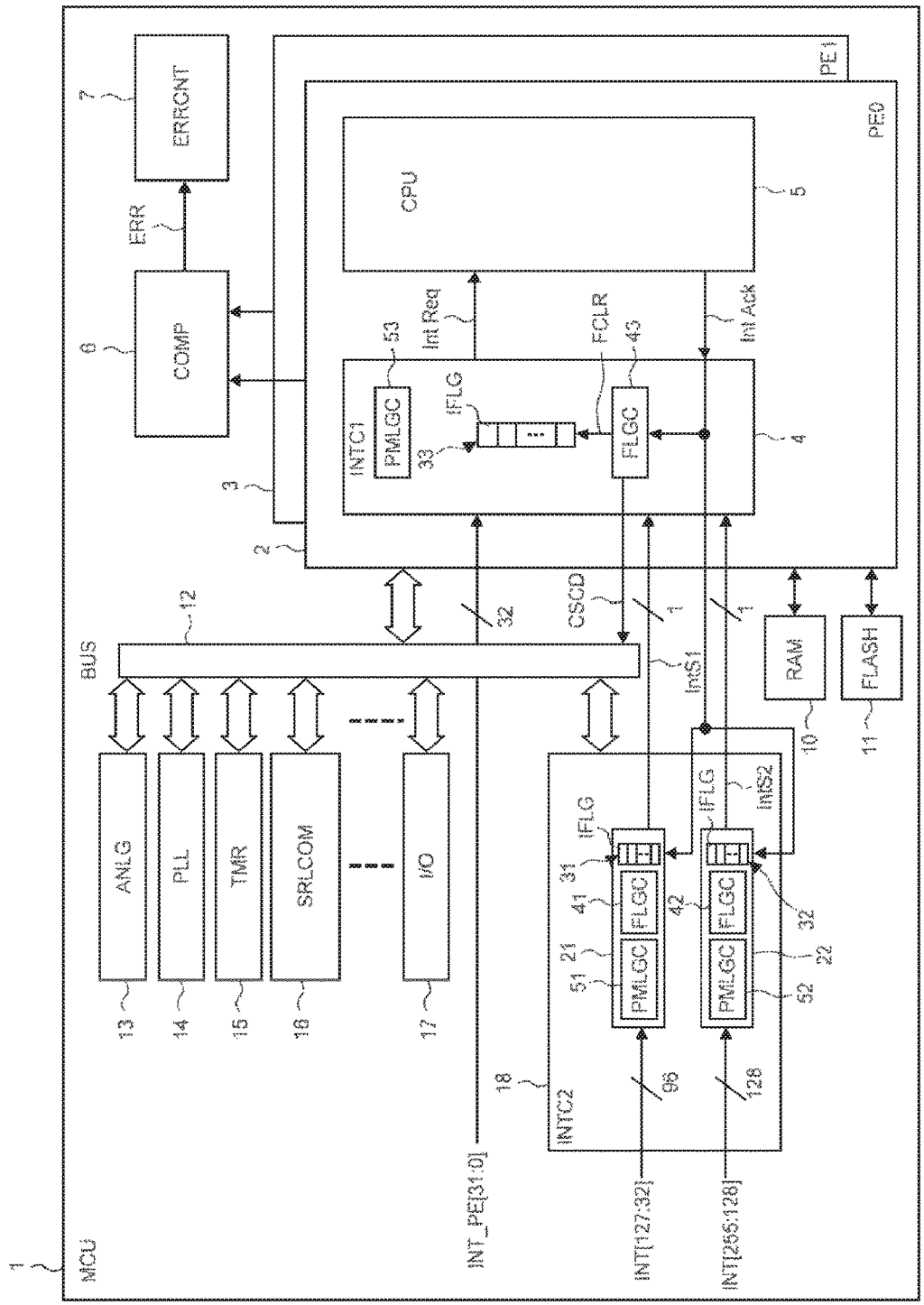
FIG. 2 is a block diagram illustrating a configuration of the microcomputer.

FIG. 2 illustrates a configuration of a microcomputer. Although not limited in particular, a microcomputer (MCU) 1 in FIG. 2 is formed into one semiconductor substrate like single crystal silicon, by the CMOS integrated circuit manufacturing technique, and is realized as a semiconductor integrated circuit device.

The microcomputer 1 has a processing element (PE0) 2 and a processing element (PE1) 3 identical to each other in a dual manner. Each of the processing elements 2 and 3 has a master interrupt controller (INTC1) 4 and a central processing unit (CPU) 5. The central processing units 5 of both the processing elements 2 and 3 execute the same command in synchronization with the same clock signal. The master interrupt controllers 4 of both the processing elements 2 and 3 perform reception processing by receiving the same interrupt request signal and output interrupt signals to the corresponding central processing units 5. Signals generated by the respective parallel operations of the processing elements 2 and 3 and other internal information are compared by a comparator (CMP) 6, for example, in units of the operation cycles of the central processing unit 5. If there is a discrepancy between the comparison results, an error signal ERR notifies an error control circuit (ERRCNT) 7 of the discrepancy. Specific contents of notification and contents of specific processing for the notification of the discrepancy are determined appropriately in accordance with the software executed by the microcomputer 1 or the contents of the system to which the microcomputer 1 is adapted, and are not limited in particular. The dualization of the processing elements 2 and 3 such as this is an example of the lock-step architecture as means for implementing the fail-safe function and enables quick detection of a failure in the microcomputer 1 or in a system to which the microcomputer 1 is applied. However, the lock-step architecture like this doubles the hardware scale as a matter of course.

For example, a RAM 10 such as an SRAM, a storage device such as a flash memory (FLAH) 11 that is an electrically rewritable nonvolatile memory, are coupled to the processing elements 2 and 3, and further, a plurality of circuit modules is coupled via an internal bus 12, as peripheral circuits. As the circuit modules, the microcomputer 1 has, for example, an analog circuit (ANLG) 13 such as a DA conversion circuit configured to convert a digital signal into an analog signal and an AD conversion circuit configured to convert an analog signal into a digital signal, a phased lock loop circuit (PLL) 14, a timer circuit (TMR) 15, a serial communication circuit (SRLCOM) 16, an input/output port (I/O) 17, a slave interrupt controller (INTC2) 18, or the like. Data and signals output from the above-described peripheral circuits are supplied to both the dualized processing elements 2 and 3, but it is assumed that the supply of data and signal to the peripheral circuits is performed by the processing element 2, which is one of the processing elements 2 and 3, defined as a master.

Here, the interrupt signal paths of the slave interrupt controller 18 and the master interrupt controller 4 are cascade-coupled. The cascade coupling of the interrupt controllers is adopted for extending the interrupt control function when the number of interrupt request input terminals of the master interrupt controller 4 is small in comparison with the number of interrupt requests to be processed. Although not limited in particular, the slave interrupt controller 18 includes a first slave interrupt controller (INTC2_0) 21 and a second slave interrupt controller (INC2_1) 22.

Next, the basic configuration of the cascade coupling of the interrupt controllers 4, 21, and 22 will be explained with reference also to FIG. 1.

The first slave interrupt controller 21 is made to be capable of receiving an interrupt request signal INT [127: 32] from 96 interrupt request input terminals and outputs an interrupt signal IntS1 from an interrupt request output terminal in accordance with the result of the reception control on the input interrupt request signal.

The second slave interrupt controller 22 is made to be capable of receiving an interrupt request signal INT [255: 128 ] from 128 interrupt request input terminals and outputs an interrupt signal IntS2 from an interrupt request output terminal in accordance with the result of the reception control on the input interrupt request signal.

The master interrupt controller 4 is made to be capable of receiving, for example, 32 interrupt request signals INT_PE [31:0] and the interrupt signals IntS1 and IntS2 from 34 interrupt request input terminals, and outputs one interrupt signal IntReq to the central processing unit 5 from an interrupt request output terminal in accordance with the result of the reception control on the input signal.

When an interrupt request signal is input, each of the interrupt controllers 4, 21, and 22 sets an interrupt request flag IFLG corresponding to the input interrupt request signal, and determines an interrupt mask for the interrupt request by the set interrupt request flag IFLG and determines an interrupt priority level. The determination of interrupt mask and the determination of interrupt priority level are an example of the above-described reception processing. That is, the interrupt controllers 4, 21, and 22 ignore the corresponding interrupt request flag IFLG with respect to the interrupt request for which the interrupt mask is not cancelled, receive the interrupt request with the highest priority level of the interrupt request flags IFLG in a set state, as the interrupt request with the highest priority, and output the interrupt signals IntS1, IntS2, and IntReq. At this time, the master interrupt controller 4 treats the interrupt signals IntS1 and IntS2 in the same way as the interrupt request signal and processes the signals. In FIG. 2, reference numerals 31, 32, and 33 denote interrupt request flag circuits showing generically a plurality of interrupt request flags for each interrupt controller. Actually, in the interrupt request flag circuits 31, 32, and 33, the interrupt request flag IFLG is provided for each interrupt request signal. However, the interrupt request flag circuit 31 does not have interrupt request flags corresponding to the interrupt signals IntS1 and IntS2. The control of the above-described determination of priority and mask for the interrupt request in each of the interrupt controllers 21, 22, and 4 is performed by each of priority and mask control logic circuits (PMLGC) 51, 52, and 53.

The central processing unit 5 completes the execution of the command in the middle of execution by receiving the interrupt signal IntReq output from the master interrupt controller 4 and performs saving processing, and outputs an interrupt acknowledgment signal IntAck to the interrupt controllers 4, 21, and 22.

When the interrupt acknowledgment signal IntAck is returned from the central processing unit 5, the master interrupt controller 4 outputs, to the central processing unit 5, a vector in response to the interrupt request determined to have the highest priority at that time if the interrupt request determined to have the highest priority is not by the interrupt signals IntS1 and IntS2 from the slave-side and at the same time, clears the set state of the interrupt request flag IFLG in response to the interrupt request determined to have the highest priority, to the reset state. On the other hand, if the interrupt request determined to have the highest priority is by the interrupt signals IntS1 and IntS2 from the slave-side, the master interrupt controller 4 notifies the slave interrupt controllers 21 and 22 of a cascade code CSCD indicating which slave interrupt controller has generated the request via, for example, the internal bus 12 and does not output a vector or clear the interrupt request flag by itself. The control is performed by, for example, a flag control logic circuit (FLGC) 43.

When the interrupt acknowledgment signal IntAck is activated and when specified by the cascade code CSDC, the slave interrupt controllers 21 and 22 supply a vector in response to the interrupt request determined to have the highest priority to the central processing unit 5 via the internal bus 12 and at the same time, clears the set state of the interrupt request flag IFLG in response to the interrupt request determined to have the highest priority, to the reset state. The control is performed by, for example, flag control logic circuits (FLGC) 41 and 42 held by the slave interrupt controllers 21 and 22, respectively.

FCLR denotes flag clear signals output from the flag control logic circuits 41, 42, and 43 to the corresponding interrupt request flag circuits 31, 32, and 33. The flag clear signal FCLR is a signal of a plurality of bits that specifies and clears the interrupt request flag to be cleared in the interrupt request flag circuits 31, 32, and 33.

It is possible for the central processing unit 5 to perform interrupt processing in response to an interrupt request by fetching a vector supplied from one of the interrupt controllers 4, 21, and 22 and executing an interrupt processing routine specified on the basis of the vector.

<<Failure Detection in Interrupt Control System>>

Although not limited in particular, it is supposed that the above-mentioned microcomputer 1 is mounted and utilized in the ECU related to the functional safety of the power train, the body system, or the like of an automobile. In such a case, the number of kinds of functional safety-related interrupt requests is large and it is not possible for the dualized master interrupt controller 4 to accommodate all the interrupt requests. Even in the case where a slave interrupt controller not dualized receives the functional safety-related interrupt requests, consideration is given to the microcomputer 1 so that a failure in the interrupt controller and the interrupt signal system thereof can be easily detected in order to enhance reliability of the processing of a large number of functional safety-related interrupts. Hereinafter, details of the failure detection technique of the interrupt control system in the microcomputer 1 will be explained.

<<First Embodiment of Failure Detection>>

FIG. 1 illustrates details of the interrupt control system in the microcomputer 1.

In the first slave interrupt controller 21, the 96 interrupt request signals INT [127:32] are supplied to the interrupt request flag circuit 31 and the interrupt request flag IFLG is provided in response to each of the interrupt request signals INT [127:32]. The output of each interrupt request flag IFLG is supplied to the priority and mask control logic circuit 51 and the priority and mask control logic circuit 51 receives one interrupt request corresponding to one of the flag outputs in a set state on the basis of the mask setting and priority level set in advance by the central processing unit 5, and outputs the interrupt request signal IntS1.

Particularly, one of the interrupt request signals INT [127:32] is a test interrupt request OSTM generated periodically at predetermined intervals from the timer 15. The remaining 95 interrupt request signals are, for example, non-safety-related interrupt request signals NSRS that request proper processing other than the above-described functional safety-related interrupt processing.

In the second slave interrupt controller 22, the 128 interrupt request signals INT [255:128] are supplied to the interrupt request flag circuit 32 and the interrupt request flag IFLG is provided in response to each interrupt request signal INT [255:128]. The output of each interrupt request flag IFLG is supplied to the priority and mask control logic circuit 52 and the priority and mask control logic circuit 52 receives one interrupt request corresponding to one of the flag outputs in a set state on the basis of the mask setting and priority level set in advance by the central processing unit 5, and outputs the interrupt request signal IntS2.

Particularly, a part of the interrupt request signals INT [255:128] are safety-related interrupt request signals SRS that request the above-described functional safety-related interrupt processing and the rest is the same non-safety-related interrupt request signals NSRS as those in the previous description.

In the master interrupt controller 4, 32 interrupt request signals INT_PE [31:0] and the interrupt signals IntS1 and IntS2 are supplied to the interrupt request flag circuit 33 and the interrupt request flag IFLG is provided in correspondence to each of the interrupt request signals INT_PE [31:0] and the interrupt signals IntS1 and IntS2. The output of each interrupt request flag IFLG is supplied to the priority and mask control logic circuit 53 and the priority and mask control logic circuit 53 receives one interrupt request corresponding to one of the flag outputs in a set state on the basis of the mask setting and priority level set in advance by the central processing unit 5 and outputs the interrupt signal IntReq. The interrupt request signal INT_PE [31:0] may be one of the safety-related interrupt request signal SRS and the non-safety-related interrupt request signal NSRS or may be an appropriate mixture thereof. The reason is that the reliability of the master interrupt controller 4 is guaranteed to be high by dualization.

Failure detection in the interrupt signal system by the safety-related interrupt request signal SRS will be described in detail. The central processing unit 5 sets the timer 15 to an initial state and causes the timer 15 to generate the test interrupt request OSTM periodically at predetermined intervals. The central processing unit 5 considers that there is some sort of abnormality in the interrupt signal system by the safety-related interrupt request signal SRS by referring to the interrupt request flag corresponding to the safety-related interrupt request signal SRS held by the second slave interrupt controller 22 in response to the test interrupt request OSTM, and by determining that the same interrupt request flag is in a set state a plurality of times in succession by the reference made by a plurality of the test interrupt requests. In other words, in the case where it is detected that the same interrupt request flag IFLG is kept in a set state twice or more in succession as the result of the reference to the interrupt request flag IFLG corresponding to the safety-related interrupt request signal SRS within the second slave interrupt controller 22 for each test interrupt request OSTM generated periodically, the interrupt by the interrupt request flag IFLG in a set state is not processed yet and still remains and it can be considered that the longer this states lasts, the higher the probability of the occurrence of a failure in the interrupt signal system is. By considering this state as a state where there is an abnormality, it is possible to enhance the functional safety of the system controlled by the microcomputer 1. In particular, the lock-step architecture implemented by entirely dualizing the slave interrupt controller 22 is not caused to completely bear the responsibility, and thus a considerable increase in the circuit scale is not necessary. Furthermore, it is not necessary to create a test pattern for the built-in self-test by spending time and the amount of power consumption does not increase considerably because the built-in self-test is not conducted. As described above, it is possible to detect an abnormality in the interrupt control system without increasing the circuit scale, without spending time to create a test pattern, and without considerably increasing the amount of power consumption accompanying the test. The abnormality in the interrupt control system supposed here is the abnormality supposed in the path from the input of the interrupt request signal of the second slave interrupt controller 22 to the input of the interrupt signal IntReq in the central processing unit 5 via the master interrupt controller 4. It is recommended that exceptional processing, recovery processing, or the like, which is capable of dealing with a supposed abnormality, is prepared as new response processing by the central processing unit 5 for the determination result that there is an abnormality. The contents thereof are not at all limited as described previously.

Since the timer interrupt request using the timer 15 is used as the test interrupt request OSTM, it is possible to arbitrarily determine intervals at which the test interrupt request OSTM is generated periodically on the basis of the control of the central processing unit 5. Furthermore, the central processing unit 5 in the user mode causes the timer 15 to generate the test interrupt request periodically in accordance with the software (for example, user program). Consequently, the transition from the user mode to a special test mode is not necessary and the processing by the test interrupt is performed as one piece of interrupt processing in the user mode, and thus it is possible to detect a deterioration in the interrupt control system due to the secular change in the system or in the actual device.

The interval at which the test interrupt request OSTM is generated periodically is a time shorter than the FTTI (Fault Tolerant Time Interval) taken into consideration in the fail-safe processing by the safety-related interrupt request. In the normal state, the processing by the safety-related interrupt request is completed before the FTTI time elapses and the interrupt request flag thereof is cleared from the set state. In contrast to this, if there is an abnormality, the processing by the safety-related interrupt request is not completed even after the FTTI time elapses and the interrupt request flag is kept in a set state. Consequently, by setting the interval at which the test interrupt request is generated to be shorter than the FTTI time, it becomes possible to consider that there is an abnormality by determining that the same interrupt request flag is in a set state twice in succession in the processing of the first time test interrupt request and in the processing of the second time test interrupt request.

Figure 3:
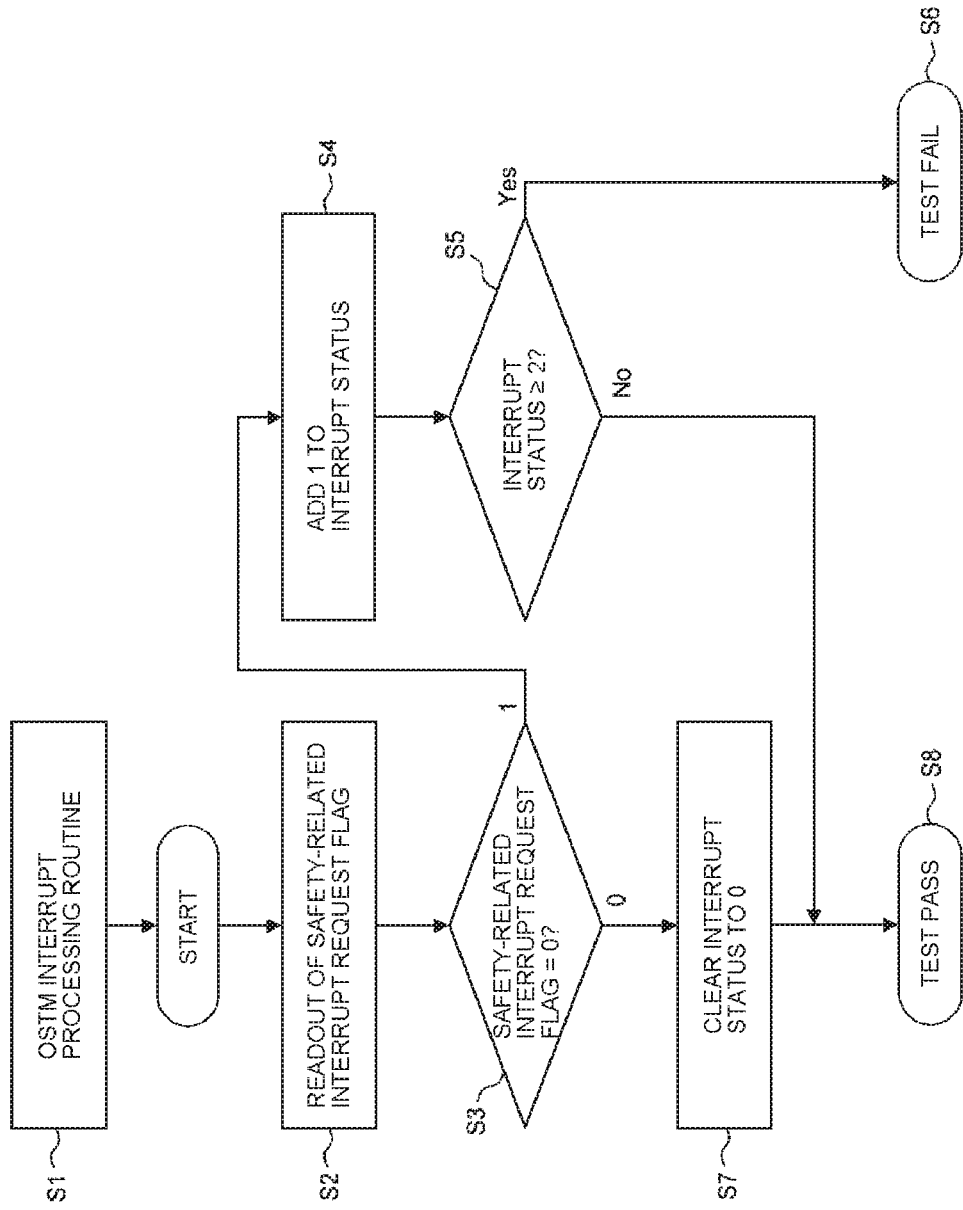
FIG. 3 is a flowchart illustrating an operation flow of a central processing unit in response to a test interrupt request signal OSTM.

FIG. 3 illustrates an operation flow of the central processing unit 5 responding to the test interrupt request OSTM. The central processing unit enters the OSTM interrupt routine to start the test, through the activation of the interrupt signal IntReq by the test interrupt request OSTM (S1).

First, the central processing unit 5 reads out all the interrupt request flags (safety-related interrupt request flags) in response to the safety-related interrupt request signal SRS from the interrupt request flag circuit 32 (S2). The central processing unit 5 determines whether or not the read-out safety-related interrupt request flag is in a set state (e.g., the logic value is 1) (S3). The central processing unit has an interrupt status for each interrupt request flag and adds a value of 1 to the corresponding interrupt status each time the set state of the interrupt request flag is determined (S4). In this manner, it is determined whether or not the value of the interrupt status is 2 (S5). When the determination result is 2, a test failed flag is set (S6) and when not 2, the test failed flag is not operated and the test is regarded as having passed (S8). When the safety-related interrupt request flag is not in a set state (e.g., the logic value is 0) at step S3, the corresponding interrupt status is cleared to a value of 0 (S7) and the test is regarded as having passed (S8). It is needless to say that the value of the interrupt status with which the test is regarded as having failed may be set to 3 or larger according to the relationship or the like between the FTTI and the setting of intervals at which the test interrupt request signal OSTM is generated by the timer 15.

When the test failed flag is set, for example, predetermined error processing corresponding thereto is performed by the central processing unit 5. For example, in the case of test failure, it is necessary to determine whether the interrupt processing by the interrupt request for which the interrupt request flag is set is not executed because of the low interrupt priority or because of a failure. For example, it is possible for the central processing unit 5 to determine that there is a failure when all the interrupt request flags are confirmed and when another interrupt request whose priority is high is not set. In the case where an interrupt request whose priority is high is set, it is sufficient to confirm that the interrupt processing in response to the interrupt request that has caused test failure is executed after the processing by the interrupt whose priority is high is completed. In the case where it is determined that there is a failure, for example, it is sufficient for the higher-order software to perform processing for putting the system into a safe state.

Figure 4:
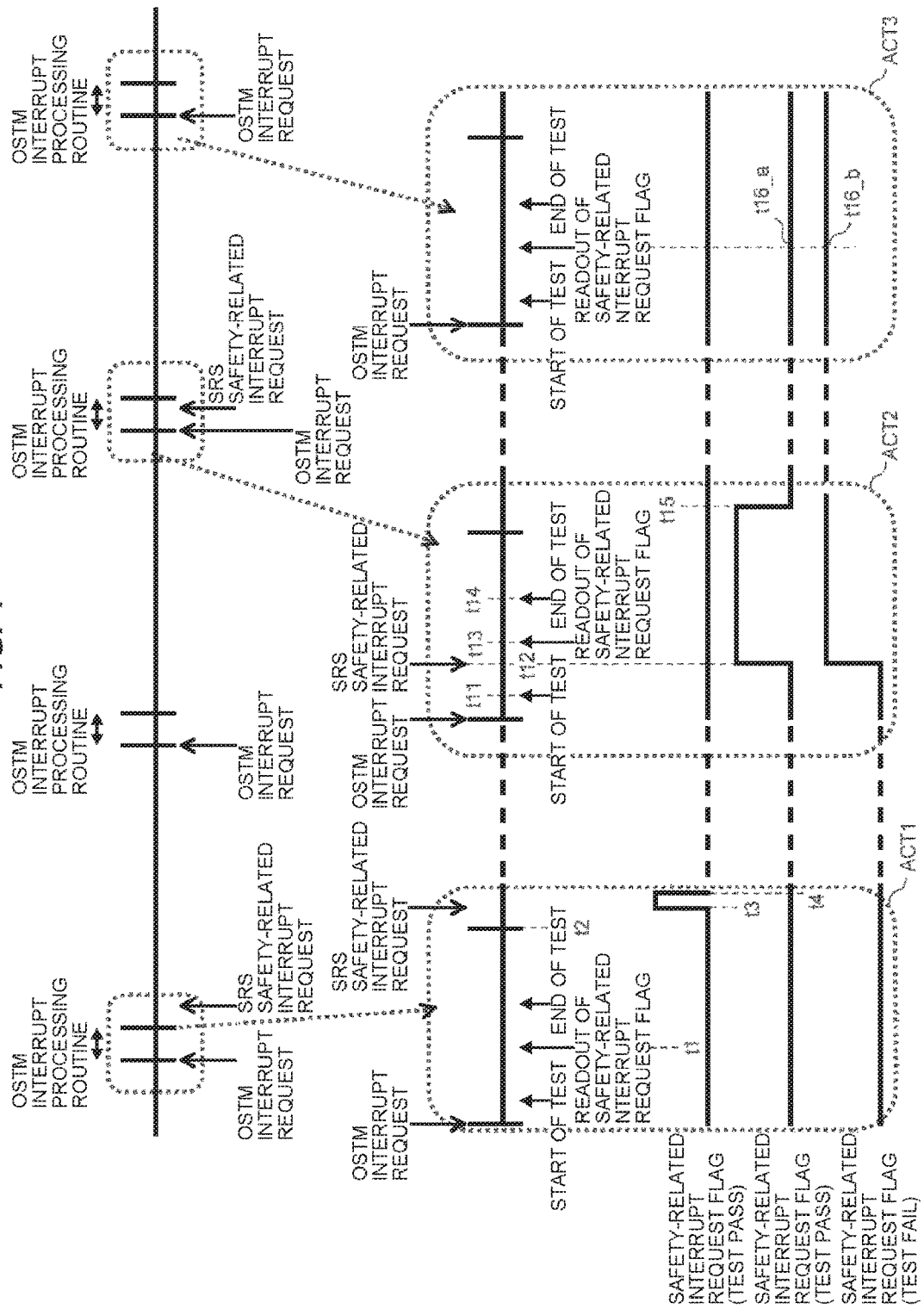
FIG. 4 is a timing chart illustrating the operation timing of test interrupt processing in response to the test interrupt request signal OSTM.

FIG. 4 illustrates an action timing of the test interrupt processing in response to the test interrupt request OSTM. When the OSTM interrupt processing routine in response to the test interrupt request OSTM is entered, the test is started and the central processing unit 5 reads out the safety-related interrupt request flag.

As illustrated in action ACT1, in the case where the read-out safety-related interrupt request flag is in the clear state (logic value is 0, low level), the test is regarded as having passed (t1). After the end of the OSTM interrupt routine (t2), if there is an SRS safety-related interrupt request, the safety-related interrupt request flag is brought into the set state (logic value is 1, high level) (t3), but the interrupt request is received by the central processing unit 5, and thus the safety-related interrupt request flag is cleared again by the central processing unit 5 (t4).

As illustrated in action ACT2, after the start of the OSTM interrupt routine (t11), if there is an SRS safety-related interrupt request, the safety-related interrupt request flag is put into a set state (logic value is 1, high level) (t12). In this case, the read-out safety-related interrupt request flag is in a set state (t13), but after the end of the OSTM interrupt routine (t14), the interrupt request corresponding to the safety-related interrupt request flag in a set state is received by the central processing unit 5, and thus the safety-related interrupt request flag is cleared (t15). There is a case where a safety-related interrupt request is generated with such timing, but the set state detected for the corresponding safety-related interrupt request flag is just once, and thus the test result by the OSTM interrupt routine will be test-passed.

As illustrated in action ACT5, if the safety-related interrupt request flag is not in a set state in the OSTM interrupt routine following the action ACT2, the test is regarded as having passed (t16_*a*), but as illustrated by t16_*b*, in the case where the safety-related interrupt request flag is set twice in succession, the previous time interrupt request is not received yet by the central processing unit 5 and the safety-related interrupt request flag remains without being cleared. In other words, it can be considered that there is a high possibility that a failure has occurred in the safety-related interrupt signal system. Consequently, in this case, the test is regarded as having failed.

According to the first embodiment, the following operation and effect are obtained.

(1) In the case where it is detected that the same safety-related interrupt request flag is kept in a set state twice or more in succession as the result of the reference to the safety-related interrupt request flags within the slave interrupt controller 22 for each test interrupt request OSTM generated periodically, the interrupt by the safety-related interrupt request flag in a set state still remains without being processed yet by the central processing unit 5 and it is considered that the probability that a failure has occurred in the interrupt signal system is high. By considering this state as a state where there is an abnormality, it is possible to enhance the functional safety of the system controlled by the microcomputer 1.

(2) Since the lock-step architecture implemented by dualizing the slave interrupt controller 22 is not caused to completely bear responsibility, a considerable increase in the circuit scale is not necessary.

(3) Furthermore, it is not necessary to create the test pattern for the built-in self-test by spending time and the amount of power consumption does not increase considerably through the built-in self-test.

(4) By inputting, to the different slave interrupt controllers 21 and 22, the test interrupt request and the interrupt request for which the interrupt request flag is to be referred to, even in the case of the cascade coupling, it is possible to limit the range in which the interrupt request flags are referred to in the interrupt processing by the test interrupt request, to the second slave interrupt controller 22 on the side of the functional safety-related interrupt request. Then, in the case where it is considered that there is an abnormality, it is made possible to take measures against the abnormality by limiting the range to the interrupt signal system including the second slave interrupt controller 22.

(5) By adopting the configuration in which the slave interrupt controllers 21 and 22 are cascade-coupled to the master interrupt controller 4, it is possible to deal with a large number of functional safety-related interrupt request signals one interrupt controller cannot process.

(6) By adopting the lock-step architecture by dualizing the master interrupt controller 4 and the central processing unit 5, it is possible to contribute to further enhancement of the functional safety because the lock-step architecture is adopted at a part that is accepted in terms of area.

(7) By using the timer interrupt request generated from the timer 15 at predetermined intervals as the test interrupt request OSTM, it is possible to determine any intervals at which the test interrupt request OSTM is generated periodically on the basis of the control of the central processing unit 5.

(8) The microcomputer 1 is suitable for the microcomputer used for onboard control equipped with the fail-safe function that makes great use of safety-related interrupt requests.

(9) The interval at which the test interrupt request OSTM is generated is set shorter than the FTTI time. Consequently, it is made possible to consider that there is an abnormality by determining that the same interrupt request flag is in a set state twice in succession in the processing of the first test interrupt request and in the processing of the second test interrupt request

(10) The test interrupt request OSTM is generated periodically from the timer 15 in accordance with the control of the central processing unit 5 in the user mode. The transition from the user mode to a special test mode is not necessary and it is possible to perform the processing by the test interrupt as one piece of interrupt processing in the user mode. Consequently, it is possible to easily detect deterioration due to the secular change, in the system or in the actual device.

<<Second Embodiment of Failure Detection>>

As explained in the first embodiment, in order to detect a failure in the processing system for the safety-related interrupt request by using the software of the central processing unit 5, it is premised that the test interrupt request OSTM is generated periodically as the timer interrupt. Consequently, in the case where the timer channel that generates the test interrupt request OSTM in the timer circuit 15 has failed or where a failure has occurred in the interrupt signal system from the path of the test interrupt request OSTM to the master interrupt controller 4 via the slave interrupt controller 21, it does not become possible to execute the above-described software. In a second embodiment of failure detection, the source from which the test interrupt request OSTM is generated is dualized and furthermore, the processing system of the request signal is also dualized.

FIG. 5 illustrates a main configuration according to the second embodiment as the interrupt control system of the microcomputer 1. In FIG. 5, OSTMa and OSTMb denote dualized test interrupt requests and are output from dualized individual timer channels 15*a* and 15*b*, respectively. The timer circuits 15 each have a plurality of timer channels to which a timer can be set and the timer channels 15*a* and 15*b* are formed by utilizing the timer channels. A timer is set to the timer channels 15*a* and 15*b* so that the repetitive timer operation is possible with the same timing, and as long as both the timer channels 15*a* and 15*b* operate normally, the dualized test interrupt requests OSTMa and OSTMb exhibit the same signal waveform. The test interrupt requests OSTMa and OSTMb are supplied to a slave interrupt controller 21A, and because of this, the output of the slave interrupt controller 21A is supplied to a master interrupt controller 4A.

Figure 6:
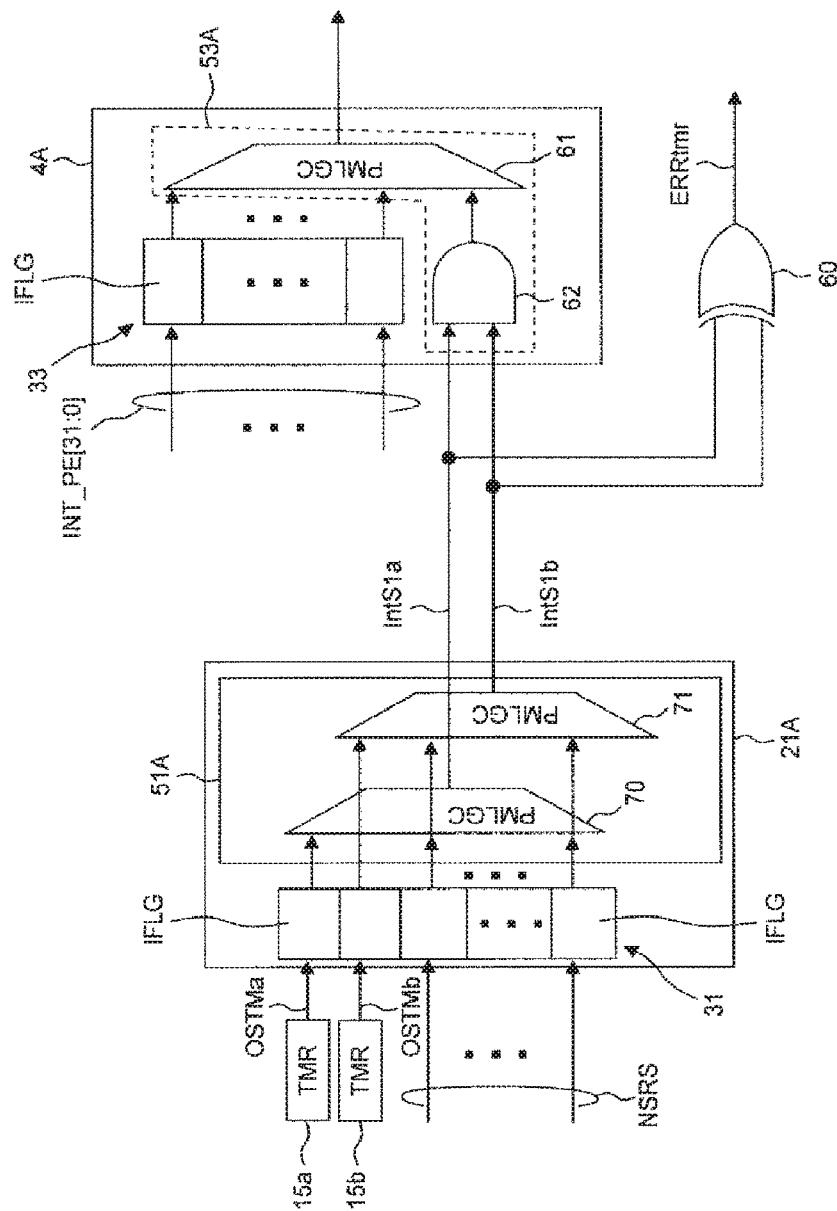
FIG. 6 is a block diagram illustrating specific examples of a slave interrupt controller and a master interrupt controller when attention is focused on dualized test interrupt request signals OSTMa and OSTMb.

FIG. 6 illustrates specific examples of the slave interrupt controller 21A and the master interrupt controller 4A when attention is focused on the dualized test interrupt requests OSTMa and OSTMb. The slave interrupt controller 21A separately has a priority and mask control logic circuit (PMLGC) 70 configured to perform control of determination of priority and mask for the test interrupt request by the test interrupt request OSTMa and other interrupt requests, and has a priority and mask control logic circuit (PMLGC) 71 configured to perform control of the determination of priority and mask for the test interrupt request by the test interrupt request OSTMb and other interrupt requests. The priority and mask control logic circuit (PMLGC) 70 outputs an interrupt signal IntS1a as the result of control of the determination of priority and mask, and the priority and mask control logic circuit (PMLGC) 71 outputs an interrupt signal IntS1b as the result of control of the determination of priority and mask.

An exclusive OR gate 60 determines whether or not the interrupt signals IntS1a and IntS1b coincide with each other and generates an error signal ERRtmr. The error control circuit 7 determines the discrepancy between the timer interrupt signals IntS1a and IntS1b and the abnormality in the timer channels 15a and 15b by the error signal. The master interrupt controller 4A inputs both the interrupt signals IntS1a and IntS1b to an AND gate 62 and in the case where both are activated, the master interrupt controller 4A supplies the activated interrupt signal IntS1 to a priority and mask control logic circuit (PMLGC) 61. Consequently, the priority and mask control logic circuit (PMLGC) 61 processes the AND signal of the interrupt signals IntS1a and IntS1b as one interrupt signal.

According to the second embodiment, the discrepancy between the test interrupt requests OSTMa and OSTMb is detected by the error control circuit 7 and it is possible to detect the discrepancy before the start of the OSTM interrupt processing routine, and thus it is possible to guarantee the validity for the result of the interrupt processing by the test interrupt request. Therefore, it is possible to avoid a state where the software test by the central processing unit 5 based on the test interrupt request cannot be conducted due to a failure in the OSTM test interrupt processing system and it is possible to further enhance safety from the viewpoint of the functional safety of the system.

Meanwhile, other configurations, and the operation and effect in the second embodiment are the same as those in the first embodiment, and thus detailed explanation thereof is omitted.

<<Third Embodiment of Failure Detection>>

Failure detection in the safety-related interrupt control system is to check, in consideration of the functional safety, that a failure has not occurred in the safety-related interrupt request signal system through the software test by the central processing unit 5 during the normal operation of the system. In a third embodiment, in the case where the failure detection result is test failed, the processing of causing the system to transition to a safe state is not performed but the original processing is continued. The reason is that there is a case where the continuation of the normal operation is required even when a failure has occurred from the viewpoint of availability.

FIG. 7 illustrates a main configuration according to the third embodiment as the interrupt control system of the microcomputer 1. In the third embodiment, there is provided a selector 80 configured to select one of the safety-related interrupt request signals SRS and to supply it to the first slave interrupt controller 21 as one interrupt request signal.

The selection by the selector 80 is made by, for example, a selection signal SEL output from the central processing unit 5. When it is considered that there is an abnormality by referring to the interrupt request flag according to the safety-related interrupt request signal SRS of the second slave interrupt controller 22, the central processing unit 5 performs processing of causing the selector 80 to select, by using the selection signal SEL, the interrupt request corresponding to the interrupt request flag for which it is determined that the same interrupt request flag is in a set state a plurality of times in succession by the reference made by a plurality of the test interrupt requests and of supplying the interrupt request to the first slave interrupt controller 21. Consequently, it becomes possible to process the safety-related interrupt request by which a failure in the interrupt signal system is supposed, in the interrupt signal system passing through the first slave interrupt controller 21. By such processing, it becomes possible to continue the original processing by the interrupt request. In short, it becomes possible to perform the continuous processing as an emergency measure when a problem occurs in the system. In other words, it is possible to enhance availability of the system. Alternatively, it is possible to enhance fail operability. Meanwhile, in such a case, it is desirable to leave the interrupt request flag as it is without clearing it, for which it is detected that the interrupt request flag is not processed in the central processing unit in the second slave interrupt controller 22. The reason is that it is a good idea to enable detection of the abnormality at all times even if an emergency measure becomes possible from the viewpoint of the safety of the system.

Other configurations, and the operation and effect in the third embodiment are the same as those in the first embodiment, and thus detailed explanation thereof is omitted. Although not illustrated in particular, it is also possible to apply the third embodiment to the second embodiment.

<<Fourth Embodiment of Failure Detection>>

FIG. 8 illustrates a main configuration according to a fourth embodiment as the interrupt control system of the microcomputer 1. In the First to third embodiments, the master interrupt controller 4 does not include the interrupt request flag IFLG for the interrupt signals IntS1 and IntS2 from the slave interrupt controllers 21 and 22. A master interrupt controller 4B of the fourth embodiment adopts an interrupt request flag circuit 33B provided with the interrupt request flag IFLG for the interrupt signals IntS1 and IntS2. The interrupt request flag IFLG provided in the interrupt request flag circuit 33B in correspondence to the interrupt signals IntS1 and IntS2 is set by the activation of the interrupt signals IntS1 and IntS2. When the interrupt in response to the interrupt signals IntS1 and IntS2 is received by the priority and mask control logic circuit (PMLGC) 53 and the interrupt signal IntReq is activated, if the interrupt acknowledgment signal IntAck is returned from the central processing unit 5 in response thereto, a flag control circuit 43B outputs the CSCD toward the slave interrupt controllers 21 and 22, and at the same time, clears the interrupt request flag IFLG in response to the interrupt signal IntS1 or IntS2 received at that time. That is, the operation to the interrupt request flag IFLG in response to the interrupt signals IntS1 and IntS2 is the same as the operation to other interrupt request flags.

As described above, if the master interrupt controller 4B also has the interrupt request flag in response to the interrupt request signals IntS1 and IntS2 from the slave interrupt controllers 21 and 22, it is useful to specify which path has failed in the case where the result of the above-described OSTM interrupt processing routine based on the test interrupt request is test failed. In the case of test failure, it is recommended that also the interrupt request flag IFLG in response to the interrupt signal IntS1 or IntS2 of the master interrupt controller 4B is read out and utilized. For example, in the case where it is determined that the same interrupt request flag within the slave interrupt controller 22 is in a set state twice in succession in a plurality of OSTM interrupt processing routines, if the interrupt request flag added to the master interrupt controller 4B is not put into a set state, it can be considered that the path from the slave interrupt controller to the input of the master interrupt controller has failed. Further, in the case where the interrupt request flag is brought into the set state both in the slave interrupt controller 22 and in the master interrupt controller 4B, it is possible to consider that there is an abnormality inside the slave interrupt controller 22 or in the path from the master interrupt controller 4B to the interrupt input of the central processing unit 5.

According to the above, by referring to the state of the interrupt request flag with respect to the interrupt request of each of the slave-side and the master-side that are cascade-coupled, it is made possible to determine whether or not the failed portion is before the interrupt request flag of the master interrupt controller. In the case of test failure, it is possible to contribute to specification of the failed path.

Other configurations in the fourth embodiment are the same as those in the first embodiment, and thus detailed explanation thereof is omitted. Although not illustrated in particular, it is also possible to apply the fourth embodiment to the second or third embodiment.

<<Fifth Embodiment of Failure Detection>>

Figure 9:
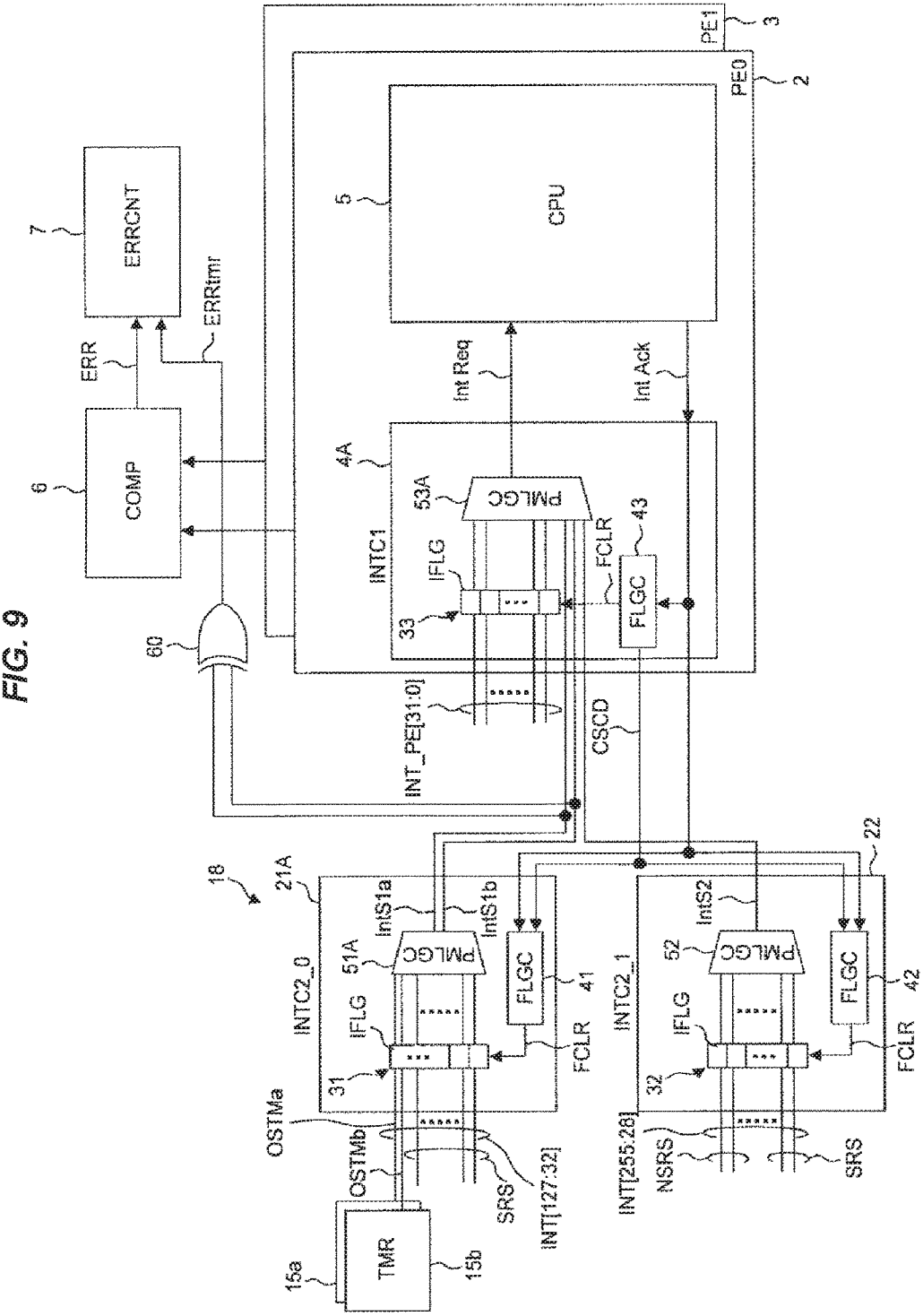
FIG. 9 is a block diagram illustrating a main configuration according to a fifth embodiment as an interrupt control system of the microcomputer.

FIG. 9 illustrates a main configuration according to a fifth embodiment as the interrupt control system of the microcomputer 1. The fifth embodiment uses the configuration according to the second embodiment and the difference from the second embodiment lies in that the first slave interrupt controller 21A is not limited to the non-safety-related interrupt request signal NSRS and the safety-related interrupt request signal SRS is also supplied thereto to enable the use thereof. Consequently, in the OSTM interrupt routine, the central processing unit 5 is caused also to determine whether or not the interrupt request flag in response to the safety-related interrupt request signal SRS in the first slave interrupt controller 21A is brought into the set state a plurality of times in succession. In FIG. 9, the non-safety-related interrupt request signal NSRS is not input to the first slave interrupt controller 21A, but it is needless to say that the non-safety-related interrupt request signal NSRS and the safety-related interrupt request signal SRS may be input mixedly.

If the generation system of the test interrupt request OSTM is dualized as in the second embodiment, it is possible to conduct the software test by the OSTM interrupt processing routine after checking that there is no failure in the path from the first slave interrupt controller 21A to the central processing unit 5. Consequently, it is no longer necessary to input all the safety-related interrupt requests to the second slave interrupt controller 22 and it becomes possible to input the safety-related interrupt request also to the first slave interrupt controller.

According to the above, it is possible to detect without fail the issuance of a test interrupt request and the occurrence of an abnormality in the reception control thereof and to easily guarantee that a test interrupt request is generated normally and enabled to be received by the central processing unit 5.

In other words, it becomes possible to detect an abnormality in the processing to receive an interrupt request by the first slave interrupt controller 21A and in the signal path to the master interrupt controller 4, and thus, it is possible to contribute to further enhancement of the functional safety by supplying the input of the functional safety-related interrupt request signal to the first slave interrupt controller 21A without limiting to the second slave interrupt controller 22. Consequently, it is made possible to easily deal with the case where the number of safety-related interrupt request signals SRS increases and can no longer be received by the second slave interrupt controller 22.

Other configurations in the fifth embodiment are the same as those in the second embodiment, and thus detailed explanation thereof is omitted.

<<Sixth Embodiment of Failure Detection>>

FIG. 10 and FIG. 11 illustrate a main configuration according to a sixth embodiment as the interrupt control system of the microcomputer 1. In the first to fifth embodiments, the test interrupt request OSTM is supplied to the slave interrupt controllers 18, 21, and 21A, but this is not limited and may also be supplied to the master interrupt controller 4 as in FIG. 10 and FIG. 11. By supplying the test interrupt request OSTM to the master interrupt controller 4 in which the lock-step architecture is adopted by dualization, the occurrence of an abnormality in the processing path of the test interrupt request OSTM is detected easily, and thus, as in the second embodiment, it is possible to avoid the state where the software test by the central processing unit 5 on the basis of the test interrupt request cannot be conducted because of a failure in the OSTM test interrupt processing system, and thus it is possible to further enhance safety from the viewpoint of the functional safety of the system.

As illustrated in FIG. 11, it is also possible to implement the slave interrupt controller 18 by one slave interrupt controller 22. Furthermore, although not illustrated, the number of slave interrupt controllers cascade-coupled to the master interrupt controller may be three or more and the coupling configuration of a plurality of slave interrupt controllers to the master interrupt controller is not limited to the parallel coupling configuration and a hierarchical cascade coupling may also be accepted. It is needless to say that the number of stages of the hierarchical coupling in the cascade coupling may be three or more, as a matter of course.

The present invention is not limited to the above-described embodiments and it is needless to say that various modifications are possible within the scope not deviating from its gist.

The configuration is not limited to, for example, a configuration that adopts the lock-step architecture by dualizing the central processing unit and the master interrupt controller. A configuration that adopts the lock-step architecture by dualizing only the central processing unit may also be accepted. It may also be possible to interpret the central processing unit in the same meaning as the processor core. In other words, the processor core includes, for example, a cache memory, a TLB, and an accelerator, such as a floating point operation unit, like the central processing unit.

The method for clearing the interrupt request flag when the interrupt controllers are cascade-coupled and the method for outputting a vector are not limited to the above-described embodiments, and can be appropriately modified. The transmission of the code CSCD may be performed by a dedicated signal for each slave interrupt controller and as the flag clear signal FCLR, the dedicated signal may be used.

In addition, if there is a margin in terms of area efficiency of the semiconductor chip, the adoption of the lock-step architecture by dualization, in a part of slave interrupt controllers, is not prevented. In this case, it is to be understood that the safety-related interrupt signal in question is the interrupt request signal supplied to the interrupt controller that does not adopt the lock-step architecture by dualization.

Furthermore, it is naturally possible to apply the present invention also to a microcomputer of multiprocessor core as well as a microcomputer of single processor core. Moreover, the microcomputer is a general term of the data processing device such as the data processor, microprocessor, and SoC (System On Chip) type semiconductor device. A one-chip device may also be accepted and a module device in which multiple chips are combined into modules may also be accepted.

In addition, the microcomputer is not limited to the onboard use. Furthermore, the interrupt request flag referred to in the interrupt processing routine in response to the test interrupt request is not limited to the functional safety-related interrupt request flag. In the above-described embodiments also, it may also be possible to detect a failure by including the functional non-safety-related interrupt request flag as the target of reference.

What is claimed is:

1. A microcomputer comprising:
an interrupt controller including an interrupt request circuit which holds a first interrupt request flag and a second interrupt request flag, and which outputs an interrupt signal in response to one of a first interrupt request and a second interrupt request;
a central processing unit (CPU) which outputs an interrupt acknowledgment signal based on the interrupt signal; and
a timer which generates, periodically at an interval, a test interrupt request, wherein
the interrupt controller sets the first interrupt request flag in the interrupt request circuit in response to the first interrupt request, resets the first interrupt request flag set in the interrupt request circuit in response to the interrupt acknowledgment signal originated with the first interrupt request, sets the second interrupt request flag in the interrupt request circuit in response to the second interrupt request, and resets the second interrupt request flag set in the interrupt request circuit in response to the interrupt acknowledgment signal originated with the second interrupt request, and
the CPU refers to the first and second interrupt request flags held in the interrupt request circuit based on the test interrupt request, and determines that there is an abnormality in an interrupt control system when at least one of the first interrupt request flag and the second interrupt flag is set a plurality of times in succession.

2. The microcomputer according to claim 1, wherein the CPU controls the interval at which the test interrupt request is generated periodically.

3. The microcomputer according to claim 1, wherein
the interrupt controller comprises a first interrupt controller,
the interrupt request circuit comprises a first interrupt request circuit,
the interrupt signal comprises a first interrupt signal,
the interrupt controller further includes a first priority and mask control logic circuit which generates, based on a mask setting and priority level set, the first interrupt signal in response to one of the first interrupt request and the second interrupt request,
the interrupt controller further comprises a second interrupt controller which includes a second interrupt request circuit which holds a third interrupt request flag, and a second priority and mask control logic circuit which generates, based on a mask setting and priority level set, a second interrupt signal in response to one of the first interrupt signal and a third interrupt request,
the CPU outputs the interrupt acknowledgment signal based on the second interrupt signal,
the second interrupt controller sets the third interrupt request flag in the second interrupt request circuit in response to the third interrupt request, and resets the third interrupt request flag set in the second interrupt request circuit in response to the interrupt acknowledgment signal originated with the third interrupt request, and
the CPU refers to the third interrupt request flag held in the second interrupt request circuit based on the test interrupt request, and determines that there is an abnormality in the interrupt control system when the third interrupt request flag is set a plurality of times in succession.

4. The microcomputer according to claim 3, wherein the second interrupt controller outputs, to the CPU, a vector corresponding to the third interrupt request in response to the interrupt acknowledgment signal originated with the third interrupt request.

5. The microcomputer according to claim 3, wherein
the interrupt controller further comprises a third interrupt controller which includes a third interrupt request circuit which holds a fourth interrupt request flag, and which outputs a third interrupt signal in response to a fourth interrupt request,
the second priority and mask control logic circuit generates, based on a mask setting and priority level set, the second interrupt signal in response to one of the first interrupt signal, the third interrupt request and the third interrupt signal,
the third interrupt controller sets the fourth interrupt request flag in the third interrupt request circuit in response to the fourth interrupt request, and resets the fourth interrupt request flag set in the third interrupt request circuit in response to the interrupt acknowledgment signal originated with the fourth interrupt request, and
the CPU refers to the fourth interrupt request flag held in the third interrupt request circuit based on the test interrupt request, and determines that there is an abnormality in the interrupt control system when the fourth interrupt request flag is set a plurality of times in succession.

6. The microcomputer according to claim 5, wherein
the third interrupt controller further includes a third priority and mask control logic circuit which generates, based on a mask setting and priority level set, the third interrupt signal in response to one of the fourth interrupt request and the test interrupt request, and
the CPU refers to the first, second, third and fourth interrupt request flags based on the second interrupt signal originated with the test interrupt request.

7. The microcomputer according to claim 6, wherein a priority of the fourth interrupt request is lower than those of the first and second interrupt requests.

8. The microcomputer according to claim 6, wherein
the timer comprises a first timer,
the test interrupt request comprises a first test interrupt request,
the microcomputer further comprises a second timer which generates, periodically at an interval, a second test interrupt request, and a comparator,
the third interrupt controller further includes a fourth priority and mask control logic circuit which generates, based on a mask setting and priority level set, a fourth interrupt signal in response to one of the fourth interrupt request and the second test interrupt request, and
the comparator compares the third interrupt signal with the fourth interrupt signal.

9. The microcomputer according to claim 6, further comprising a selector which receives the first and second interrupt requests, wherein
when the CPU refers to the first interrupt request flag to determine that there is an abnormality in the interrupt control system, the CPU generates a select signal for selecting the first interrupt request,
the selector selects and outputs the first interrupt request to the third interrupt controller according to the select signal, and
the third priority and mask control logic circuit, based on the mask setting and priority level set, the third interrupt signal in response to one of the fourth interrupt request, the test interrupt request and the first interrupt request.

* * * * *